United States Patent
Hardt

(10) Patent No.: US 6,611,117 B1
(45) Date of Patent: Aug. 26, 2003

(54) DRIVE CIRCUIT FOR A BRUSHLESS DC MOTOR

(75) Inventor: Eric A. Hardt, Tempe, AZ (US)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 09/556,717

(22) Filed: Apr. 21, 2000

(51) Int. Cl.[7] ............................................... H52P 7/00
(52) U.S. Cl. ...................................... 318/254; 388/904
(58) Field of Search ................................. 318/254, 138, 318/438, 439, 798–812, 432, 434; 388/903, 904, 800, 804, 811, 819, 907.5, 930

(56) References Cited

U.S. PATENT DOCUMENTS

| | | | |
|---|---|---|---|
| 5,093,891 A | * 3/1992 | Komiyama et al. | 388/813 |
| 5,481,641 A | * 1/1996 | Nakamura et al. | 388/800 |
| 5,592,058 A | * 1/1997 | Archer et al. | 318/254 |
| 5,963,706 A | * 10/1999 | Baik | 318/254 |
| 6,040,668 A | * 3/2000 | Huynh et al. | 318/934 |

* cited by examiner

Primary Examiner—Khanh Dang
(74) Attorney, Agent, or Firm—Schulte Roth & Zabel LLP

(57) ABSTRACT

A drive circuit for a brushless DC motor controls at least one of a number of possible operation features of the motor. The drive circuit includes a driver stage for providing a current for a stator coil and varies which of the number of possible operation features of the motor are controlled. The operation features of the motor include inrush current limit control, PWM speed control, analog speed control, detecting a locked rotor condition, setting an alarm following detection of the locked rotor condition, restarting the motor following the locked rotor condition, detecting a low speed condition, and setting an alarm following detection of the low speed condition. Some of the operation features of the motor utilize at least one parameter that defines the desired operation of the feature. The drive circuit further varies the parameters of the operation features without changing the physical configuration of the brushless DC motor.

44 Claims, 8 Drawing Sheets

DRIVE CIRCUIT FOR A BRUSHLESS DC MOTOR

BACKGROUND OF THE INVENTION

1. Field of the Invention

This invention relates generally to brushless DC motors and, more specifically, to a drive circuit for a brushless DC motor.

2. Background Description

Brushless DC motors generally consist of two major stages: a pre-driver stage and an actual driver stage. The actual driver stage may be bipolar or unipolar. A bipolar driver stage consists of four switching devices, e.g., field effect transistors (FETs) or bipolar junction transistors (BJTs), arranged in a full-bridge configuration. The switching devices are driven by complementary pulses generated by the pre-driver stage such that the switching devices that are located diagonally with respect to one another are turned on at the same time. A unipolar driver stage consists of two switching devices arranged in a half-bridge configuration, only one of which is turned on at one time.

The pre-driver stage consists of a discrete integrated circuit (IC) that generates the complementary pulses for the driver stage in response to the output from a Hall sensor. In a fan, the Hall sensor is switched by a magnet included in the turning impeller of the fan. Whenever the impeller of the fan or the motor has made a full revolution, the magnetic field of the impeller magnet changes relative to the position of the Hall sensor so that the output of the Hall sensor switches from one logic state (e.g., a logic low or a logic high) to the complementary logic state. Thus, there is effectively a closed loop from the output of the driver stage back to the pre-driver stage.

The closed loop from the output of the driver stage to the pre-driver stage enables the fan to run essentially self-sufficiently. However, there are some conditions where the fan requires assistance to operate correctly and, very importantly, safely. For example, in a "locked rotor" condition, where the fan impeller is stopped for any reason, the fan has to turn itself off in order not to burn out the switching devices in the driver stage. After a predetermined time period of t seconds the fan must determine whether the fan impeller is free to resume rotating. The fan does this by turning on one output of the pre-driver stage and waiting for the impeller to turn. If the impeller does not begin to turn within a predetermined time period, the output of the pre-driver is turned off again. The fan repeats this cycle every t seconds. The timing for the restart cycles is provided by a resistor-capacitor network that is external of the pre-driver IC.

Other features have been implemented to ensure the proper operation of the fan. For example, an alarm can be generated whenever the fan is in a locked rotor condition for greater than a predetermined amount of time. Alternatively, an alarm can be generated whenever the fan is running at a speed that is below a certain RPM threshold level. Again, external circuitry is required to generate the alarm under either of these conditions.

Another feature of the fan concerns the tendency of the fan to draw a high inrush current during its startup mode of operation. To counteract this tendency, an external circuit generates a pulse-width modulated (PWM) signal to enable and disable the pre-driver and driver stages in a so-called "chopping mode" of operation during the startup period. The effect of chopping the inrush current is to inhibit the rate of current flow during the startup period to provide the fan or motor with just enough current to start the fan or motor until the fan or motor is ramped up to full speed.

It is known in the art to provide a discrete IC in conjunction with external circuitry for controlling brushless DC motors including fan motors. U.S. Pat. No. 5,583,404 entitled "Driver Circuit for Brushless DC Motors" and issued to Karwath et al. teaches the general concept of checking for a "locked rotor" condition, interrupting the supply of current to the motor for a limited period of time, and activating the alarm function in such circumstances and attempting a re-start after the passage of a predetermined time. Furthermore, it also teaches the use of stepped-up current during a start-up mode of a brushless motor in order to prevent power-on current surges.

U.S. Pat. No. 5,838,127 entitled "Single Phase Motor for Laundering Apparatus" and issued to Young et al. discloses the general concept of utilizing a position sensor for sensing the angular position of the rotatable assembly of a motor relative to the stationary assembly of the motor and generating a control signal as a function of the sensed position to reverse the direction of rotation.

U.S. Pat. No. 4,656,533 entitled "Electronically Programmable Universal Brushless DC Fan with Integral Tracking and Locked Rotor Protection" and issued to Brown discloses the concept of using a commutation sensing device such as a voltage regulator to determine fan speed and to limit the current to a fan during a start-up condition or in a locked rotor condition.

U.S. Pat. No. 5,258,696 entitled "IC Controller for Brushless DC Motors" and issued to Le discloses the concept of using a single IC chip driver for brushless DC fan motors, where the input to the IC driver consists of a signal which represents the rotor's position with respect to the stator's windings and which is used by the IC driver to generate commutation commands and commutate power to the motor's stator windings to drive the motor. Similarly, U.S. Pat. No. 5,350,988 entitled "Digital Motor Controller" and also issued to Le discloses the same concept, wherein the analog position signal of the rotor with respect to the stator is converted to digital data to be processed by the digital controller.

U.S. Pat. No. 5,013,985 entitled "Microcomputer with Motor Controller Circuit" and issued to Itoh et al. ("the '985 Patent") suggests use of a microcomputer with CPU, read only memory (ROM) and random access memory RAM in a single chip with a motor controller circuit. However, the '985 Patent does not suggest use of a microcomputer as the driver circuit for the motor. Instead, the microcomputer provides signals to the motor controller circuit for generating three-phase inverter waveforms. Neither does it suggest any of the previously mentioned features that are used to ensure the proper operation of a brushless DC fan.

U.S. Pat. No. 5,317,244 entitled "Motor Control Unit Provided with Anti-Burning Device" and issued to Ishikura describes a motor controller with the capability to prevent the burning out of the circuits by limiting the time in which current is supplied to the motor if the rotational speed of the motor falls below a predetermined level or if a "locked rotor" condition occurs. Similarly, U.S. Pat. No. 5,327,052 entitled "Method and Apparatus for Controlling Brushless DC Motor" and issued to Sakurai et al. describes a method for providing stepped-up current during the start-up mode of a brushless DC motor by reading and evaluating the rotor position and increasing the drive current to the DC motor at a predetermined rate until the rotor is rotated. Likewise, "chopping mode" operation of a brushless and sensorless DC motor is described in U.S. Pat. No. 5,350,984 entitled "Method and Apparatus for Starting a Brushless DC Motor" and issued to Carobolante et al.

There are significant disadvantages associated with implementing these features using a discrete IC in conjunction with external circuitry. In using a discrete IC, the designer is constrained by the parameters of the particular discrete IC and, to the extent that the discrete IC provides the capability to change the restart timing interval for the locked rotor condition, there exists a limited range of flexibility in changing this restart timing interval. A customer may desire the fan to generate data relating to temperature conditions, speed, and current consumption. The signals generated by the fan may need to change to communicate with the customer's interface, but a discrete IC used with external circuitry cannot accommodate changes in the data signals generated by the fan. The customer may also want to be able to upgrade his fan to include subsequently developed features and improvements. With a discrete IC driver, the customer is limited to the features provided with the purchased configuration of the fan, and the customer must purchase a new fan to obtain the benefit of any subsequently developed features or improvements.

Another significant drawback associated with implementing these features using a discrete IC in conjunction with external circuitry is the complication and inefficiency involved in manufacturing fans and motors according to a variety of different customer requirements. A manufacturer of fans and motors may need to be able to support a multitude of different driver configurations. For example, not all discrete IC drivers offer similar features, and external circuitry is needed to provide the features that are not provided by the discrete IC. Furthermore, each customer may not need all of the features provided by a particular discrete IC, and even if each customer does need all of the features provided by a particular discrete IC, the parameters of those features may vary from customer to customer. As a result, a multiplicity of physical configurations for the driver stage are inevitable when a discrete IC is used.

Accordingly, there is a need in the art to replace the multitude of different discrete driver configurations for a brushless DC motor with a single driver configuration that is adaptable to provide a customer with a customized combination of features for a brushless DC motor.

SUMMARY

The present invention is directed to a system and method that satisfies the need for a single driver configuration that is adaptable to provide a customer with a customized combination of features for a brushless DC motor.

According to an embodiment of the present invention, a drive circuit for a brushless DC motor that controls at least one operation feature of said motor, the at least one feature utilizing at least one parameter that defines the desired operation of the feature, comprises: a driver stage for providing a current to a stator coil; and means coupled to said driver stage for varying said at least one parameter. The means for varying may vary the parameter or parameters without changing the physical configuration of the brushless DC motor. The means for varying may include input means for inputting said at least one parameter. The means for varying said parameters may comprise a microcontroller that executes software program instructions to control the operation features.

One operation feature may comprise limiting the inrush current drawn by said brushless DC motor upon start-up of said motor, and the parameters may comprise a threshold reference value for said inrush current, or a compare value from which a voltage representing said inrush current is subtracted.

Another operation feature may comprise speed control of said brushless DC motor using an analog voltage, and the parameter may comprise a threshold reference value for the speed of said motor.

Yet another operation feature may comprise generating an alarm signal, and the parameters may comprise a threshold level for the speed of said DC motor, a value stored in a counter, or a value indicating a time for generating said alarm.

A further operation feature may comprise determining a locked rotor condition, and the parameter may comprise a value stored in a counter.

An even further operation feature may comprise generating an alarm in response to the detection of a locked rotor condition, and the parameter may comprise a value stored in a counter.

Another operation feature may comprise restarting said motor following the detection of a locked rotor condition, and the parameter may comprise a value stored in a counter.

According to another embodiment of the present invention, a drive circuit for a brushless DC motor that controls at least one of a number of possible operation features of said motor comprises: a driver stage for providing a current for a stator coil; and means for varying which of said number of possible operation features of said motor are controlled.

The possible operation features of said motor may comprise: speed control of said motor using a pulse-width modulated signal; speed control of said motor using an analog voltage; limiting inrush current drawn by said motor upon start-up of said motor; generating an alarm signal if the speed of said motor is below a threshold level; detecting a locked rotor condition; generating an alarm in response to the detection of a locked rotor condition; and restarting said motor following the detection of a locked rotor condition.

The above, and other features, aspects, and advantages of the present invention will become apparent from the following description read in conjunction with the accompanying drawings, in which like reference numerals designate the same elements.

DESCRIPTION OF THE PREFERRED EMBODIMENTS

Figure 1:
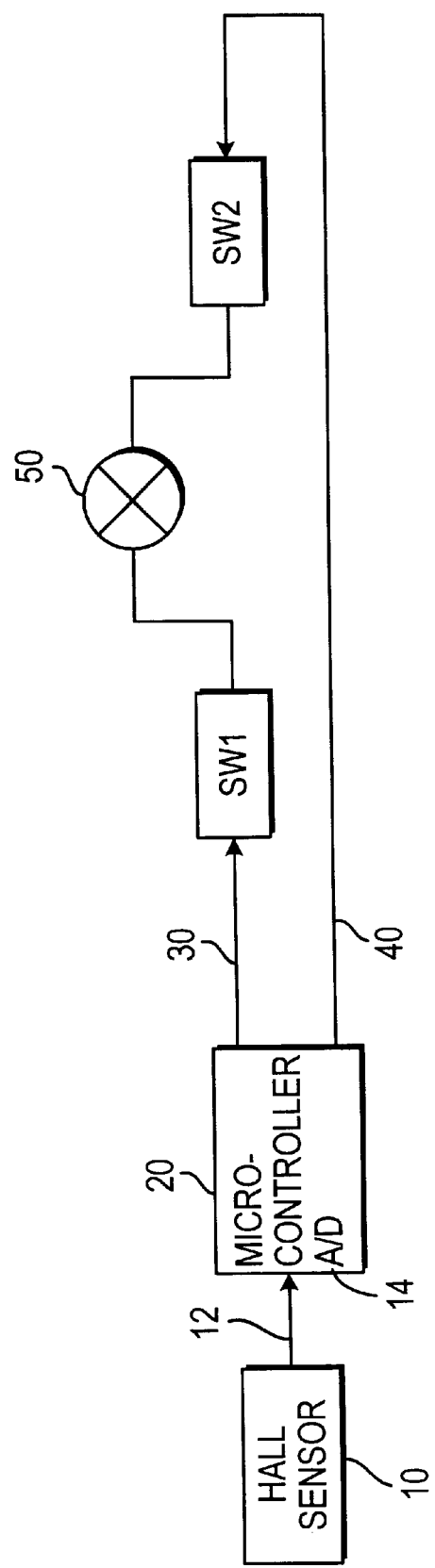
FIG. 1 shows a simplified block diagram of a brushless DC motor according to an embodiment of the present invention.
Figure 2:
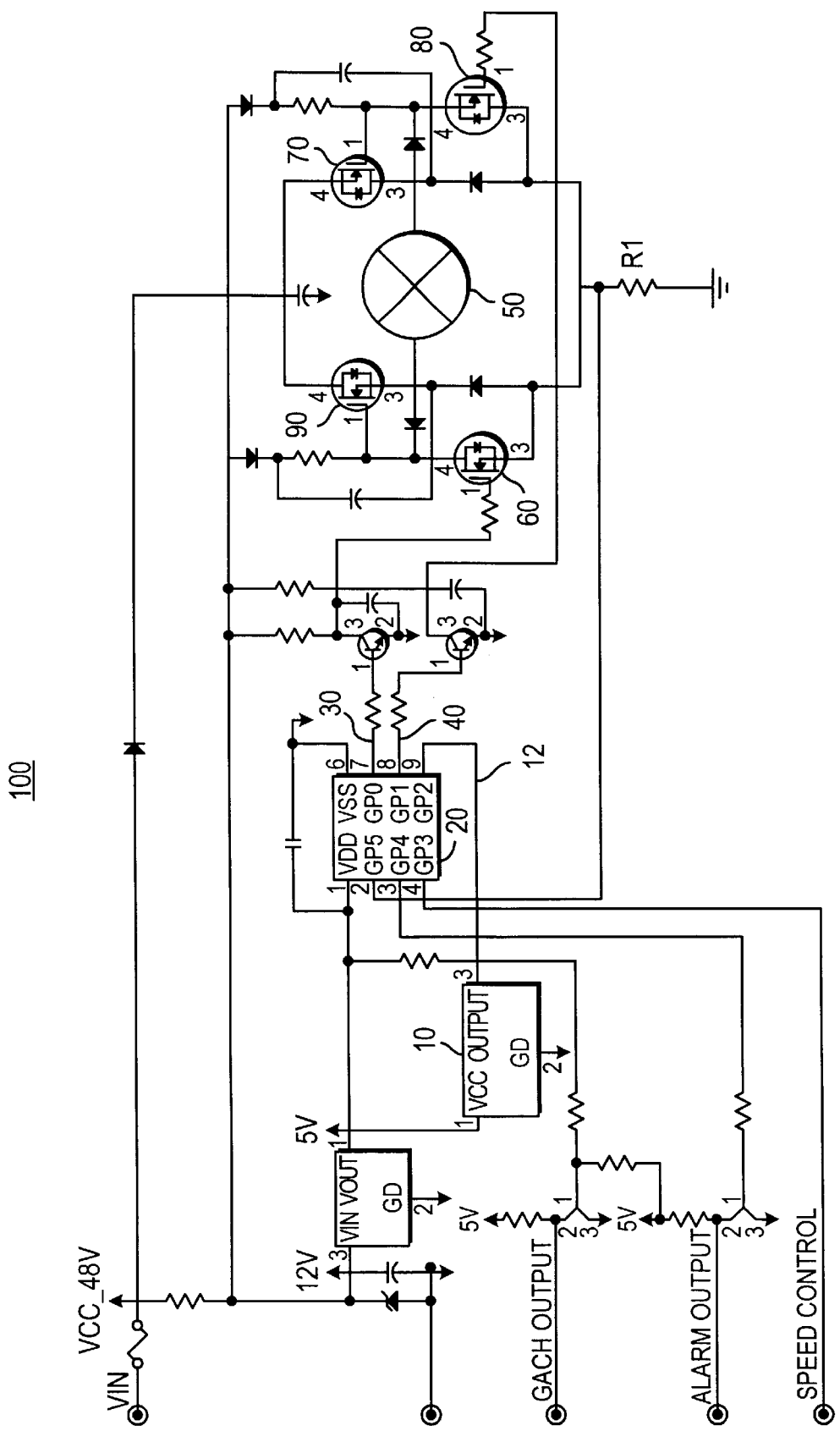
FIG. 2 shows a schematic diagram of the brushless DC motor shown in FIG. 1.

FIGS. 1 and 2 show a simplified block diagram and a schematic diagram respectively of a brushless DC motor, generally designated 100, according to an embodiment of the present invention. The motor 100 includes a Hall sensor 10 having an output 12; a microcontroller 20 having complementary outputs 30 and 40; stator coil 50; and switches SW1 and SW2. In the block diagram shown in FIG. 1, the switches SW1 and SW2 comprise the two switches that are on at the same time in a full-bridge driver stage. In the schematic diagram shown in FIG. 2, the switches SW1 and SW2 of FIG. 1 are represented by switches 60 and 70 or switches 80 and 90. In a preferred embodiment according to the present invention, the Hall sensor 10 comprises an industry part number UA3175 device and the microcontroller 20 comprises an industry part number 12C671 device.

One application for the brushless DC motor shown in FIGS. 1 and 2 is in a fan of the type used for cooling electronic circuits. Such a brushless DC fan, which is to say a fan driven by a brushless DC motor, further includes an impeller mounted in an impeller housing (not shown). The impeller of the fan is caused to rotate when current flows through the switch SW1, the stator coil 50, and the switch SW2. The direction of impeller rotation, i.e., clockwise or counter-clockwise, is determined by the direction of current flow through the switch SW1, the stator coil 50, and the switch SW2.

The impeller housing contains a permanent magnet which produces a magnetic field for the brushless DC fan. The Hall sensor 10 detects a change in the state of the magnetic field that is produced as the impeller of the brushless DC fan rotates in relation to the permanent magnet. As the impeller reaches a rotational extreme in either the clockwise or the counter-clockwise direction, the Hall sensor 10 detects the change in the state of the magnetic field of the brushless DC fan, and the output 12 of the Hall sensor changes its logic state.

The output 12 of the Hall sensor 10 is provided to the microcontroller 20, and the state of the outputs 30 and 40 of the microcontroller 20 is a function of the output 12 of the Hall sensor 10. Thus, according to an embodiment of the present invention, whenever the microcontroller 20 senses a change in the output 12 of the Hall sensor 10, the microcontroller 20 changes its outputs 30 and 40 in a complementary manner. For example, if the output 12 of the Hall sensor 10 is a logic high, the microcontroller 20 causes the output 30 to transition from a logic low to a logic high and simultaneously causes the output 40 to transition from a logic high to a logic low. It will be appreciated by those having skill in the art that the particular relationship between the state of the outputs 30 and 40 of the microcontroller 20 and the output 12 of the Hall sensor 10 can be varied to conform to the requirements of a particular brushless DC motor or fan.

Figure 3:
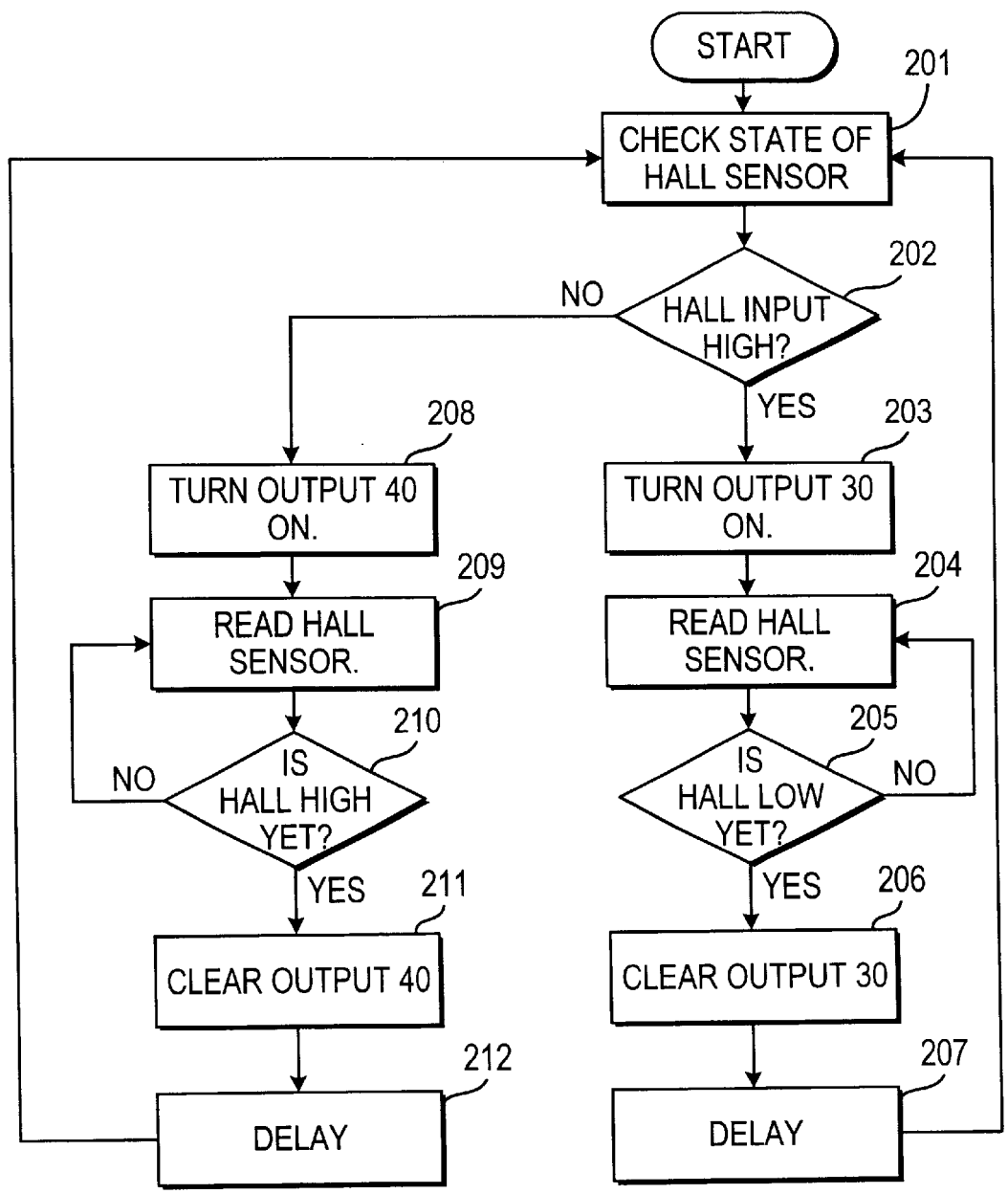
FIG. 3 shows a flowchart describing the commutation of the brushless DC motor shown in FIGS. 1 and 2.

According to an embodiment of the present invention, the microcontroller 20 changes the state of its outputs 30 and 40 in accordance with software program instructions that it executes according to techniques that are well-known in the art and which will not be described further herein. In an embodiment of the present invention, the microcontroller 20 effects commutation of the brushless DC motor by executing software program instructions in accordance with the flowchart shown in FIG. 3. A "locked rotor" condition is able to be detected simultaneously with the steps of FIG. 3. FIG. 3 shows a flowchart describing the commutation of the brushless DC motor shown in FIGS. 1 and 2. Referring to FIGS. 1 and 3, in accordance with Steps 201–212 the output signal 12 of the Hall sensor 10 of FIG. 1 is used by the microcontroller 20 to provide the outputs 30 and 40 that drive the switches SW1 and SW2 of the brushless DC motor. In Step 201, the microcontroller 20 checks the state of the output 12 of the Hall sensor 10. In Step 202, the microcontroller 20 determines whether the output 12 of the Hall sensor 10 is in a logic high state. If so, the microcontroller 20 causes the logic state of output 30 to go high in Step 203. In Steps 204 and 205 the microcontroller 204 continues to check the logic state of the output 12 of the Hall sensor 10. While the microcontroller 20 executes Steps 204 and 205, a delay counter corresponding to the output 30 is decremented. Once the output 12 of the Hall sensor 10 changes its logic state from high to low, the microcontroller 20 clears its output 30 in Step 206 and reloads the delay counter for output 30. The magnitude of the value stored in the delay counter, and hence the duration of the delay in Step 207, is a parameter that can be varied simply by editing the software program instructions that are executed by the microcontroller 20. If, for any reason, the logic state of the output 12 of the Hall sensor 10 does not change from a high to a low before the delay counter is decremented to zero, the delay counter will "roll over" and the microcontroller 20 will execute software program instructions for a "locked rotor" condition, as described further herein. As is well-known to these having skill in the art, a counter "rolls over" when the contents of the counter are decremented from 00h to FFh.

Once the output 12 of the Hall sensor 10 changes its logic state from a high to a low, the microcontroller 20 causes the logic state of output 40 to go high in Step 208. In Steps 209 and 210 the microcontroller 20 continues to check the logic state of the output 12 of the Hall sensor 10. While the microcontroller 20 executes Steps 209 and 210 a delay counter corresponding to the output 40 is decremented. Once the output 12 of the Hall sensor 10 changes its logic state from low to high, the microcontroller 20 clears its output 40 in Step 211 and reloads the delay counter for output 40. The magnitude of the value stored in the delay counter, and hence the duration of the delay in Step 212, is a parameter that can be varied simply by editing the software program instructions that are executed by the microcontroller 20. If, for any reason, the logic state of the output 12 of the Hall sensor 10 does not change from a low to a high before the delay counter is decremented to zero, the delay counter will roll over and the microcontroller 20 will execute software program instructions for a "locked rotor" condition, as described further herein.

According to another embodiment of the present invention, an analog source such as a variable resistor, a current sense resistor, a thermistor, or any other voltage source can be coupled to an analog-to-digital (A/D) input 14 of the microcontroller 20 to effect inrush current limiting or analog speed control. Whenever an analog voltage greater than zero Volts is captured on the A/D input 14 of the microcontroller 20, the software program instructions that are being executed by the microcontroller 20 call a program subroutine in which the outputs 30 and 40 are turned off. A delay value is generated according to the magnitude of the captured analog voltage and is loaded into a delay register. After the delay register has rolled over, the microcontroller 20 turns on outputs 30 and 40 and the software program instructions return control of the microcontroller 20 to the main commutation program. This effects analog speed control.

To provide inrush current limiting for the brushless DC motor, a current sense resistor R1 can be coupled to the A/D input 14 at general purpose input/output (GPIO) port 5 (pin 2) of the microcontroller 20. When a predetermined threshold for the inrush current is exceeded, the microcontroller 20 executes the same program subroutine described above in connection with analog speed control. A binary value corresponding to the magnitude of the inrush current is loaded into the delay register to delay turning on outputs 30 and 40, thereby providing the current limiting function.

Figure 4:
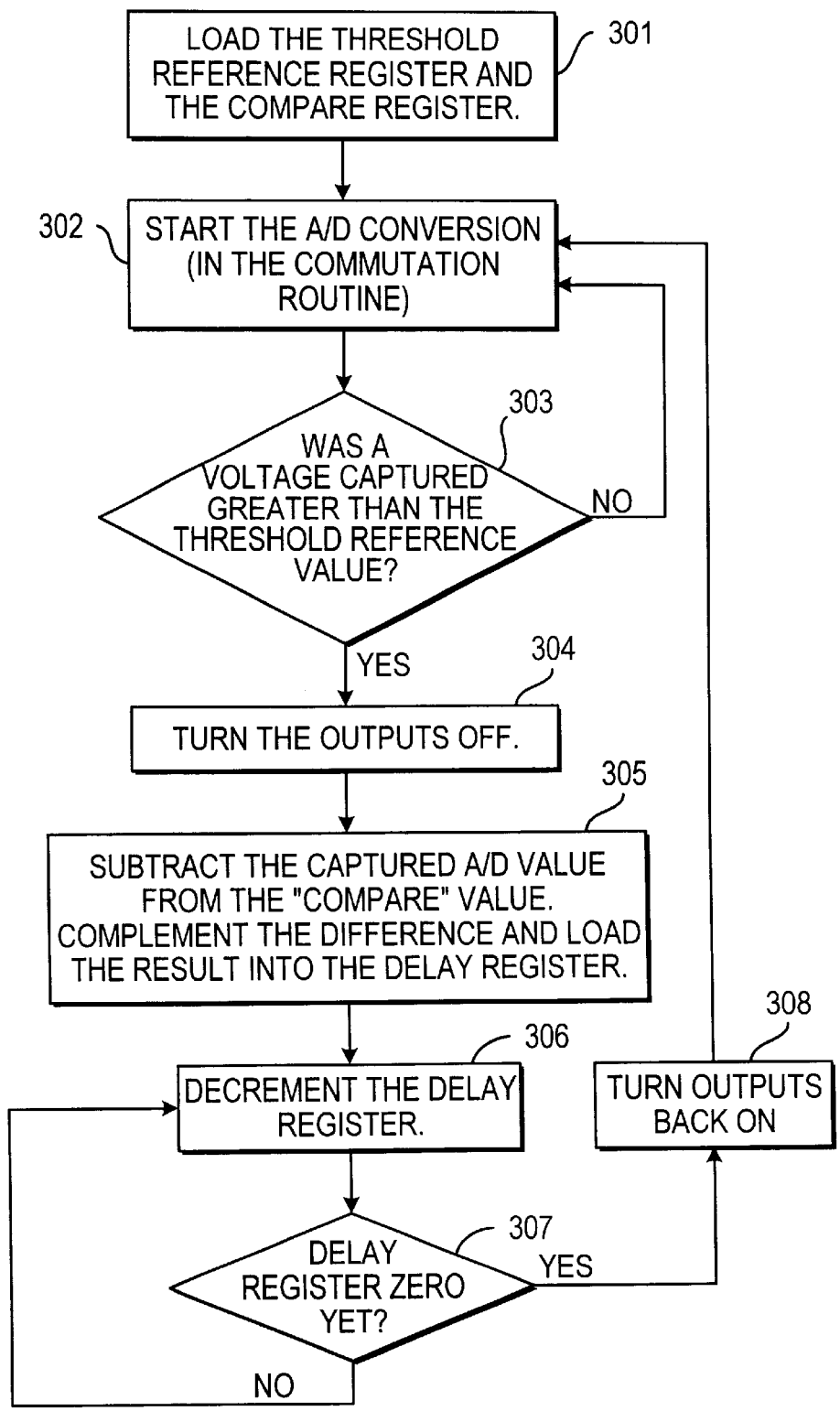
FIG. 4 shows a flowchart describing the operation of the inrush current limiting and analog speed control in the brushless DC motor shown in FIGS. 1 and 2.

FIG. 4 shows a flowchart describing the operation of the inrush current limiting and analog speed control in the brushless DC motor shown in FIGS. 1 and 2. In accordance with software program instructions that are described by the flowchart shown in FIG. 4, the microcontroller 20 loads a value into a threshold reference register and another value into a "compare" register in Step 301. In Step 302 the microcontroller 20 performs an A/D conversion of the analog voltage provided by the analog source at the A/D input 14 of the microcontroller 20. In Step 303 the microcontroller 20 determines whether the analog voltage captured at it's a/D input 14 exceeds the predetermined threshold value in the threshold reference register. If not, the microcontroller 20 continues to perform an A/D conversion of the captured analog voltage at it's a/D input. If the captured voltage exceeds the threshold value, in Step 304 the microcontroller 20 turns off the outputs 30 and 40. In Step 305, the microcontroller 20 subtracts the captured value at it's a/D input from the value stored in the compare register. The difference is complemented and the result is loaded into a delay register. In Steps 306 and 307, the delay register is decremented and the outputs 30 and 40 are turned on in Step 308 when the delay register is decremented to zero. Once the outputs 30 and 40 are turned on in Step 308, the microcontroller resumes the A/D conversion of the analog voltage captured at it's a/D input in Step 302.

The source code for an exemplary subroutine for effecting inrush current limiting is shown in Table 1. The magnitude of the threshold reference value for the inrush current in Step 301 is a parameter that can be varied simply by editing the software program instructions that are executed by the microcontroller 20. For example, the threshold reference value for the inrush current is set in the first line of the source code of Table 1. If the threshold reference register is loaded with the hexadecimal value 1Fh, the maximum allowable current flow through the current sense resistor is 1 Ampere. If the threshold register is loaded with the hexadecimal value 0Fh, the maximum allowable current flow through the current sense resistor is 0.5 Ampere. No other lines of the source code need to be changed to implement changes in the current limiting function. According to an embodiment of the present invention, the software program instructions for the microcontroller 20 are such that, if the analog voltage captured at the A/D input of the microcontroller 20 is large, the outputs 30 and 40 of the microcontroller 20 will be turned off longer. Conversely, if the analog voltage captured at the A/D input of the microcontroller 20 is small, the outputs 30 and 40 of the microcontroller 20 will be turned off for a shorter period of time. Thus, the delay values stored in the delay register constitute a duty ratio transmitted to the outputs 30 and 40 of the microcontroller 20, and the outputs 30 and 40 of the microcontroller 20 are pulse-width modulated in accordance with the magnitude of the current flowing through the current sense resistor.

TABLE 1

|      |        |              |                                            |
|------|--------|--------------|--------------------------------------------|
|      | movlw  | 0 × 1F       | ; load the working register...             |
|      | movwf  | ref          | ;...and copy to the ref register.          |
| AD   | bcf    | output1      | ;turn output 30 off.                       |
|      | bcf    | output2      | ;turn output 40 off.                       |
|      | decfsz | dlycnt2      |                                            |
|      | goto   | comp         |                                            |
|      | decfsz | dlycnt8      |                                            |
|      | goto   | comp         |                                            |
|      | goto   | locked       |                                            |
| comp | movf   | ADRES, w     | ;copy literal to w.                        |
|      | subwf  | compare, w   | ;subtract literal from compare register.   |
|      | movwf  | compare      | ;put back into the "compare" register again. |
|      | comf   | compare      | ;complement the literal in the ;"compare" register... |
|      | movf   | compare, w   | ;...and move back to w...                  |
|      | movwf  | delay        | ;...and from there to the delay register.  |
| rep2 | movlw  | 0 × 04       |                                            |
|      | movwf  | dlycnt7      |                                            |
| rep  | NOP    |              |                                            |
|      | decfsz | dlycnt7      |                                            |
|      | goto   | rep          |                                            |
|      | decfsz | delay        | ;decrement the delay value                 |
|      | goto   | rep2         |                                            |
|      | btfss  | hall         | ;read Hall sensor status                   |
|      | goto   | no2          | ;Hall output low                           |
|      | movlw  | 0 × FF       | ;copy literal to w.                        |
|      | movwf  | compare      | ;need an A/D reference value.              |
|      | bsf    | output1      | ;turn output 30 on.                        |
|      | return |              |                                            |
| no2  | movlw  | 0 × FF       | ;copy literal to w.                        |
|      | movwf  | compare      | ;need an A/D reference value.              |
|      | bsf    | output2      | ;turn output 40 on.                        |
|      | return |              | ;to main routine.                          |

Figure 5:
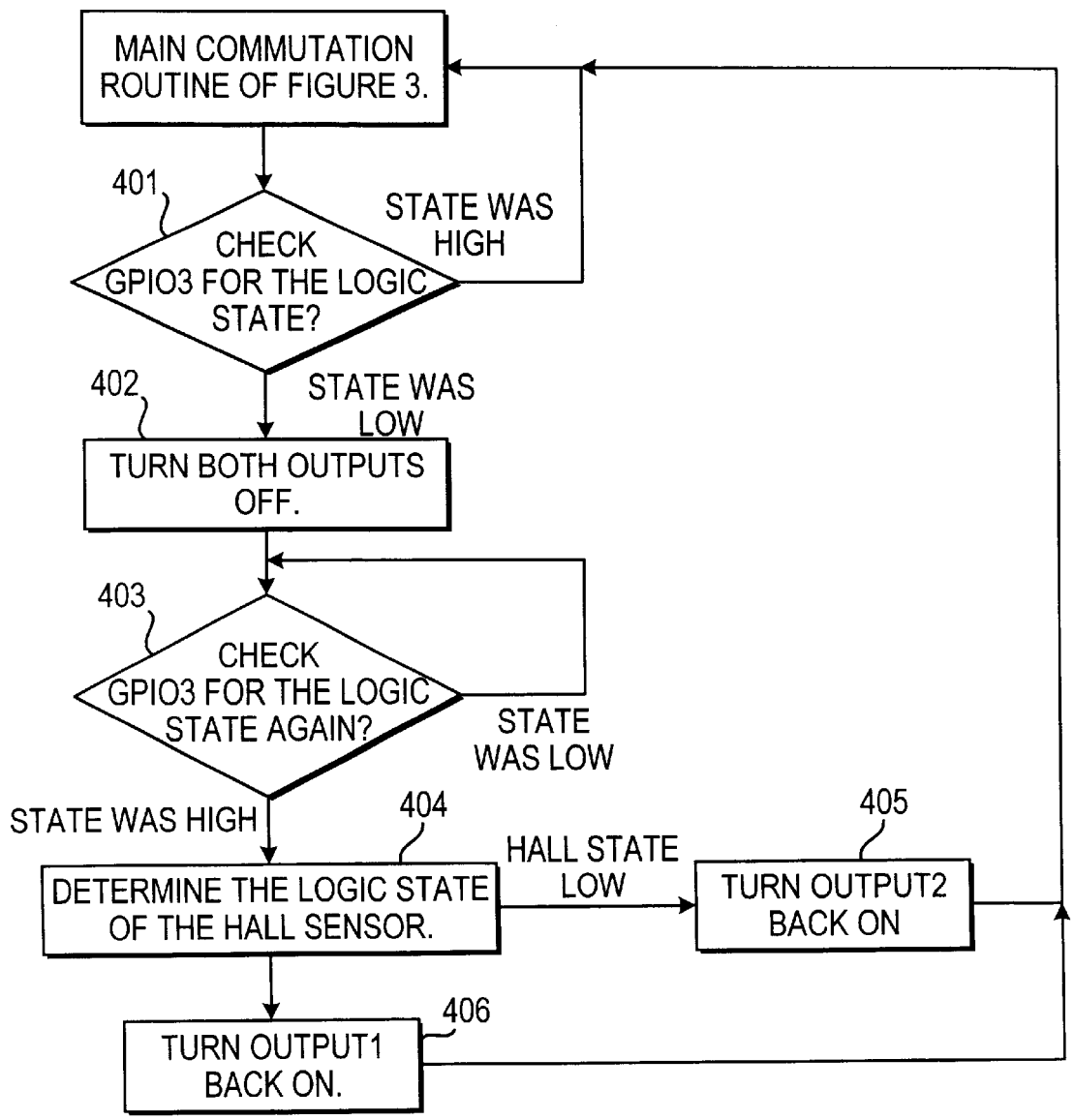
FIG. 5 shows a flowchart describing the operation of pulse-width modulated speed control in the brushless DC motor shown in FIGS. 1 and 2.

According to a further embodiment of the present invention, the microcontroller 20 executes software program instructions to effect speed control of the brushless DC motor using a pulse-width modulated (PWM) signal. The frequency and the duty ratio of the PWM signal determine the speed of the brushless DC motor and thus the fan. FIG. 5 shows a flowchart describing the operation of pulse-width modulated speed control in the brushless DC motor shown in FIGS. 1 and 2. Referring to FIG. 5, during normal commutation and during locked rotor operation, the microcontroller 20 reads the logic state at a predetermined one of its general purpose input/output (GPIO) ports in Step 401 to determine whether its logic state is a low. In the embodiment shown in FIG. 2, the microcontroller 20 comprises industry part No. 12C71 microcontroller with the GPIO port 3 (GPIO3) (pin 4) used for PWM speed control. Referring again to FIG. 5, whenever a low occurs at GPIO3, the software program instructions direct the microcontroller 20 in Step 402 to turn both outputs 30 and 40 off. The microcontroller 20 continues to check the logic level of GPIO3 and keeps the outputs 30 and 40 off as long as that logic state remains a low. When the logic level of GPIO3 goes high, in Step 404 the microcontroller 20 determines the logic state of the output 12 of the Hall sensor 10 to determine which of the outputs 30 and 40 should be turned on. If the logic state of the output 12 of the Hall sensor 10 is high, the microcontroller 20 turns a first output, e.g. output 30, on to resume commutation of the brushless DC fan. Conversely, if the logic state of the output 12 of the Hall sensor 10 is low, the microcontroller 20 turns a second output, e.g. output 40, on to resume commutation of the brushless DC fan. In this way, the use of a PWM signal is ideally suited for the dedicated speed control input at GPIO3. The source code for an exemplary subroutine for effecting PWM speed control is shown in Table 2.

TABLE 2

| speed1 | bcf | output1 | ;turn off FET1. |
|---|---|---|---|
| repeat1 | btfss | speedcntr | ;speed control input still low? |
| | goto | repeat1 | ;repeat the process. |
| | btfss | hall | ;Hall sensor high? |
| | goto | on2 | ;go to turn FET1 on. |
| | bsf | output1 | ;turn FET0 on. |
| | goto | loop1 | ;keep checking Hall sensor in ;normal routine subroutine. |
| speed2 | bcf | output2 | ;turn off FET2. |
| repeat2 | btfss | speedcntr | ;speed control input still low? |
| | goto | repeat2 | ;repeat the process. |
| | btfsc | hall | ;Hall sensor low? |
| | goto | on1 | ;go to turn output 0 off, and FET 0 ;on. |
| | bsf | output2 | ;turn FET1 on. |
| | goto | loop3 | ;keep checking Hall sensor in ;normal routine subroutine. |

According to an even further embodiment of the present invention, during normal commutation of the brushless DC fan, the software program instructions executed by the microcontroller 20 cause the microcontroller 20 to periodically call an alarm subroutine program after a predetermined amount of time has elapsed. This predetermined amount of time is a parameter that can be varied simply by editing the software program instructions that are executed by the microcontroller 20. In a preferred embodiment, a change in the logic state of the output 12 of the Hall sensor 10 from a high level to a low level generates an interrupt every 4 milliseconds when the brushless DC fan is rotating at normal speed, which causes the software program instructions for the microcontroller 20 to call the alarm subroutine program. The alarm subroutine program decrements a previously loaded counter. If the counter rolls over, an instruction to reset the alarm is performed by the microcontroller 20.

Figure 6:
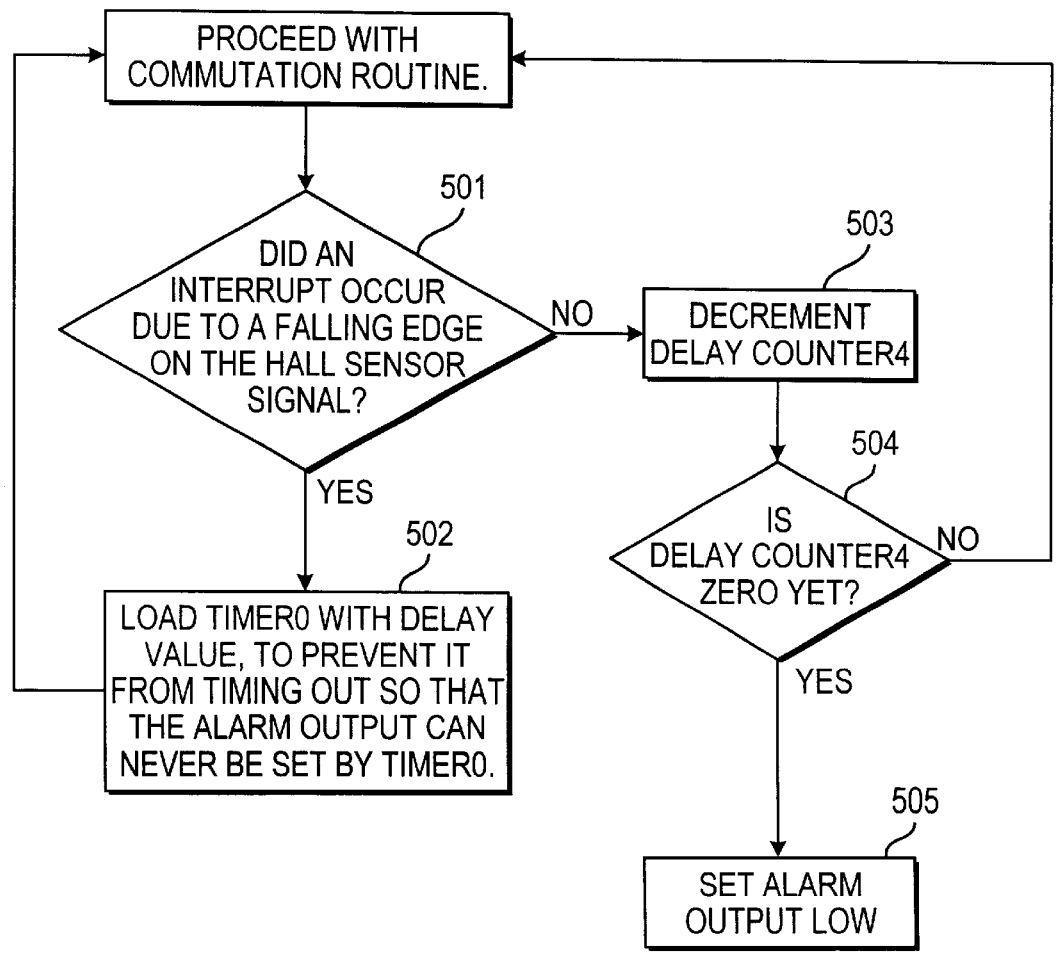
FIG. 6 shows a flowchart describing the operation of a low speed alarm in the brushless DC motor shown in FIGS. 1 and 2.

Simultaneously with the generation of the interrupt, the software program instructions cause the microcontroller 20 to load an independent timer with a hexadecimal value. FIG. 6 shows a flowchart describing the operation of a low speed alarm in the brushless DC motor shown in FIGS. 1 and 2. Referring to FIG. 6, in Step 501 the interrupt is generated, and in Step 502 the microcontroller 20 loads a timer labelled as "timer0" with a hexadecimal value. The magnitude of the value stored in timer0, and hence the duration of the timer in Step 502, is a parameter that can be varied simply by editing the software program instructions that are executed by the microcontroller 20. The source code for an exemplary subroutine for loading the timer with a hexadecimal value is shown in Table 3.

TABLE 3

| Timrset | bcf | INTCON, INTF | ;clear the GPIO2 interrupt flag ;bit (this interrupt is generated ;by the Hall sensor). |
|---|---|---|---|
| | movwf | w_temp | ;save the w register contents. |
| | swapf | STATUS, w | ;copy status register to w. |
| | bcf | STATUS, RP0 | ;make sure the desired bank is ;selected |
| | movwf | status_temp | ;save the status register ;contents. |
| | movlw | 0 × B1 | ;load w register (this literal ;determines the lowspeed alarm ;trippoint). |
| | movwf | TMR0 | ;copy w to timer0 for a trip ;point of 1200 RPM. |
| | swapf | status_temp, w | ;swap status_temp register into |

TABLE 3-continued

| | | | ;w (to set bank back to original ;state). |
|---|---|---|---|
| | movwf | STATUS | ;restore the status contents to ;the state where it was before ;leaving for the subroutine). |
| | swapf | w_temp, f | ;swap and load the "w" register ;without... |
| | swapf | w_temp, w | ;...affecting the status register. |
| | retfie | | |

If the speed of the Brushless DC fan is normal, timer0 does not roll over, but is instead reset by the generation of the next interrupt by the transition of the output 12 of the Hall sensor 10. If the output 12 of the Hall sensor 10 is inhibited, for example due to a low speed or a locked rotor condition, an interrupt to reset the timer is not generated by the falling transition of the output 12 of the Hall sensor 10 and the timer is not reset. As a result, the timer rolls over and generates its own interrupt which causes the microcontroller 20 to execute instructions for a low speed alarm subroutine. Referring again to FIG. 6, in Steps 503 and 504 the microcontroller 20 decrements a delay counter labelled counter4 and determines whether the value in counter4 has reached zero. If not, the program returns to the main commutation routine. Once the value in counter4 has reached zero, the logic state of the alarm output of the microcontroller 20 goes low in Step 505 to indicate an alarm condition. It will be appreciated by those having skill in the art that the software program instructions can be such that the alarm output of the microcontroller 20 goes high in Step 505 to indicate an alarm condition. Thus, the low speed alarm is not set immediately and counter4 provides a predetermined delay before the alarm is activated. The magnitude of the value stored in the counter4, and hence the duration of the delay in Steps 503 and 504, is a parameter that can be varied simply by editing the software program instructions that are executed by the microcontroller 20. The source code for an exemplary low speed alarm subroutine is shown in Table 4.

TABLE 4

| alarm | bcf | INTCON, T0IF | ;clear timer interrupt flag bit. |
|---|---|---|---|
| | movwf | w_temp | ;save the w register contents. |
| | swapf | STATUS, w | ;copy status register to w. |
| | bcf | STATUS, RP0 | ;make sure the desired bank is ;selected. |
| | movwf | status_temp | ;save the status register contents. |
| | decfsz | dlycnt4 | ;decrement delay counter4. |
| | goto | saved | |
| | bcf | alarmout | ;change this line to switch from alarm ;high pass, low fail and vice versa |
| | goto | load | |
| saved | swapf | status_temp, w | ;swap status_temp register into w (to ;back to original state). |
| | movwf | STATUS | ;restore the status contents to the ;state where it was before leaving for ;the subroutine. |
| | swapf | w_temp, f | ;swap and load the "w" register ;without affecting the status register |
| | swapf | w_temp, w | |
| | retfie | | ;return to commutation routine. |
| load | movlw | 0 × 03 | ;load w |
| | movwf | dlycnt6 | ;load delay counter 6 to prevent ;alarm reset. |
| | swapf | status_temp, w | ;swap status_temp register into w (to ;set bank back to original state). |
| | movwf | STATUS | ;restore the status contents to the ;state where it was before leaving for ;the subroutine. |

TABLE 4-continued

| | | |
|---|---|---|
| swapf | w_temp, f | ;swap and load the "w" register ;without affecting the status register. |
| swapf retfie | w_temp, w | |

In this low speed alarm subroutine, the microcontroller 20 re-loads a counter (labelled dlycnt6in the source code of Table 4) used in the alarm subroutine represented by Steps 503 through 505 of FIG. 6 such that during a low speed or locked rotor condition the counter cannot time out to reset the alarm. Thus, the brushless DC fan will have a latched alarm because the alarm cannot be reset once it has been set. It will be appreciated by those having skill in the art that the alarm need not be latched but can be removed once the low speed or locked rotor condition is removed.

In normal operation of the brushless DC fan, one of the outputs 30 and 40 of the microcontroller 20 is turned on while the other one of the outputs is turned off until the impeller of the fan has completed a revolution. Once the impeller has completed a revolution the microcontroller 20 complements the outputs 30 and 40. However, before complementing the outputs 30 and 40, the microcontroller 20 must be certain that the impeller actually completed the commutation cycle. According to yet another embodiment of the present invention, the software program instructions cause the microcontroller 20 to turn off its outputs 30 and 40 and to delay the turn on of the alarm output for a predetermined amount of time. The software program instructions further cause the microcontroller 20 to continuously check whether the locked rotor condition has been removed.

Figure 7:
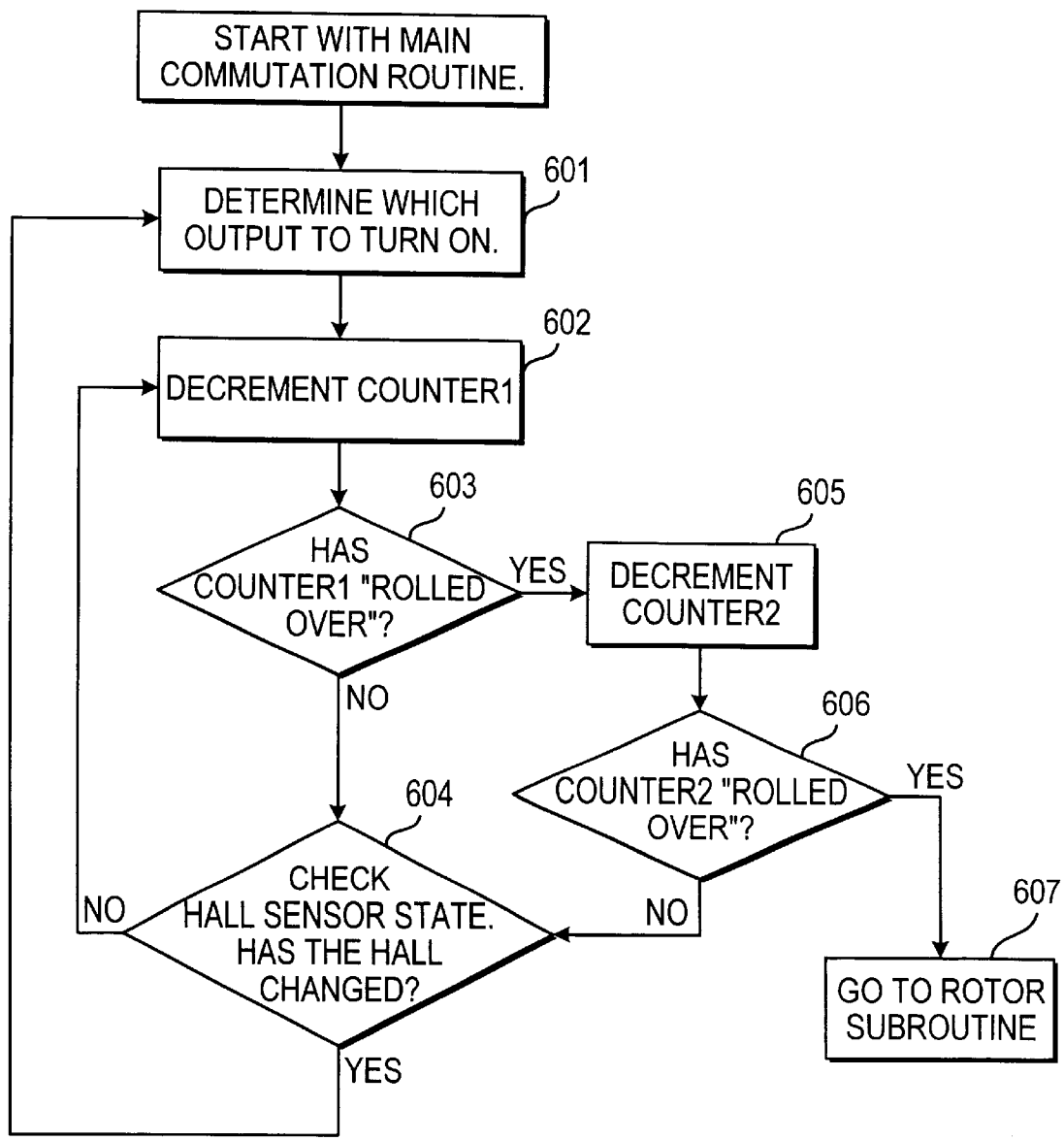
FIG. 7 shows a flowchart describing the operation of the brushless DC motor shown in FIGS. 1 and 2 in response to a locked rotor condition.

FIG. 7 shows a flowchart describing the operation of the brushless DC motor shown in FIGS. 1 and 2 in response to a locked rotor condition. Referring to FIG. 7, in Step 601 the microcontroller 20 checks the logic state of the output 12 of the Hall sensor 10 to determine which of the outputs 30 and 40 should be turned on. After turning on the appropriate output, the microcontroller 20 decrements a first delay counter labelled "counter1" in Step 602. In Step 603, the microcontroller determines whether counter1 has rolled over. If not, microcontroller 20 again checks the logic state of the output 12 of the Hall sensor 10 in Step 604. If the logic state of the output 12 has not changed, the microcontroller 20 repeats Steps 602 through 604. If the logic state of the output 12 has changed, the microcontroller 20 repeats Steps 601 through 604.

Once counter1 has rolled over, in Step 605 the microcontroller 20 decrements a second delay counter labelled counter2. In Step 606, the microcontroller determines whether counter2 has rolled over. If not, microcontroller 20 again checks the logic state of the output 12 of the Hall sensor 10 in Step 604. If the logic state of the output 12 has not changed, the microcontroller 20 repeats Steps 602, 603, 605, and 606. If the logic state of the output 12 has changed, the microcontroller 20 repeats Steps 601 through 606.

In a preferred embodiment of the present invention, the magnitude of the hexadecimal values stored in the delay counters counter1 and counter2 are chosen such that, once both delay counters counter1 and counter2 have rolled over, a time period of approximately 250 milliseconds will have elapsed. If the impeller has not made a revolution in that time period, the locked rotor subroutine program is initiated in Step 607 once counter2 has rolled over. This time period is allotted for the impeller of the brushless DC fan to make one revolution. The magnitude of the values stored in counter1 and counter2, and hence the duration of the delays in Steps 602 and 603 and Steps 605 and 606 respectively, are parameters that can be varied simply by editing the software program instructions that are executed by the microcontroller 20. It will be appreciated by those having skill in the art that the hexadecimal values stored in the delay counters counter1 and counter2 are chosen keeping in mind the time period needed by the microcontroller 20 to execute an instruction. For example, the industry part number 12C671 microcontroller used in the embodiments described herein executes an instruction in 1 microsecond. The time period needed by the microcontroller 20 to execute an instruction is used as the time base to create the delays required in Steps 602 and 603 and Steps 605 and 606, and throughout the software program instructions executed by the microcontroller 20.

Figure 8:
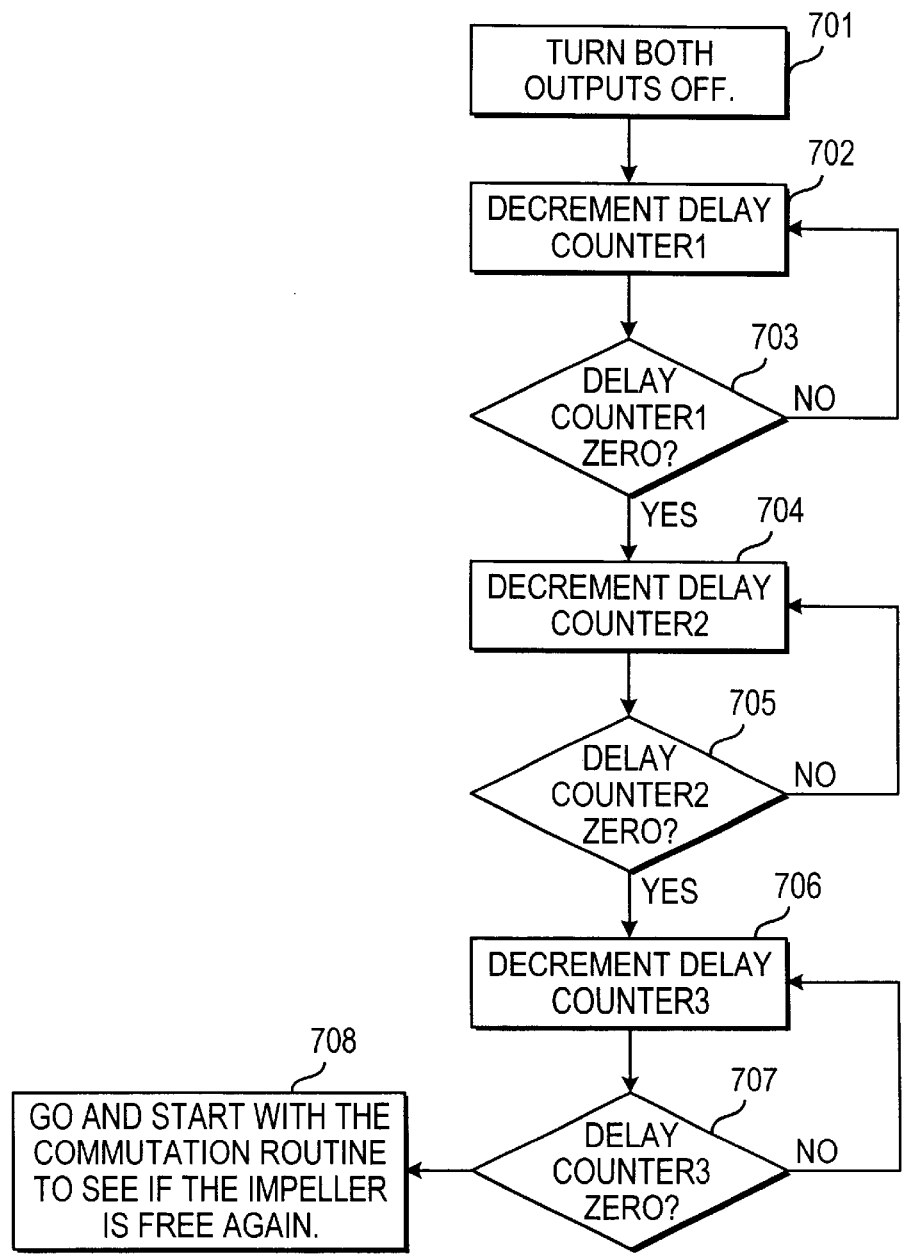
FIG. 8 shows another flowchart describing the operation of the brushless DC motor shown in FIGS. 1 and 2 in response to a locked rotor condition.

The first part of the locked rotor subroutine program turns off the outputs. 30 and 40 of the microcontroller 20 and delays the turning on of the alarm output for a predetermined number of seconds. FIG. 8 shows another flowchart describing the operation of the brushless DC motor shown in FIGS. 1 and 2 in response to a locked rotor condition. Referring to FIG. 8, in Step 701 the microcontroller 20 turns off both its outputs 30 and 40. In Steps 702 and 703 the microcontroller 20 decrements counter1 until the value in counter1 is zero. Then, in Steps 704 and 705 the microcontroller 20 decrements counter2 until the value in counter2 is zero. In a second part of the routine, a third delay counter labelled "counter3" is decremented to zero to provide a delay before the microcontroller 20 checks whether the locked rotor condition is removed and the impeller of the brushless DC fan is free. The magnitude of the values stored in counter1, counter2, and counter3, and hence the duration of the delays in Steps 702 through 707, are parameters that can be varied simply by editing the software program instructions that are executed by the microcontroller 20. The source code for an exemplary locked rotor routine is shown in Table 5.

TABLE 5

| | | | |
|---|---|---|---|
| locked | bcf | output1 | ;turn off output1. |
| | bcf | output2 | ;turn off output2. |
| | movlw | .030 | ;load w (change this value for desired delay |
| | | | ;time). |
| | movwf | dlycnt1 | ;load delay counter1. |
| dloop3 | movlw | .100 | ;load w. |
| | movwf | dlycnt3 | ;load delay counter3. |
| dloop2 | movlw | 0 x F9 | ;load w. |
| | movwf | dlycnt2 | ;load delay counter2. |
| dloop1 | nop | | ;don't do anything. |
| | decfsz | dlycnt2 | ;decrement delay counter2. |
| | goto | dloop1 | ;repeat. |
| | decfsz | dlycnt3 | ;decrement delay counter3. |
| | goto | dloop2 | ;repeat loading delay counter2. |
| | decfsz | dlycnt1 | ;decrement delay counter1. |
| | goto | dloop3 | ;repeat loading delay counter3. |
| | bcf | alarmout | ;Change this line to switch from alarm high |
| | movlw | .050 | ;pass, |
| | | | ;load w (change this value to desired restart |
| | movwf | dlycnt1 | ;time). |
| | | | ;load counter1. |
| dloopD | movlw | .100 | ;10 seconds delay. |
| | movwf | dlycnt2 | ;load second counter. |
| dloopC | movlw | 0 x f9 | ;load w. |
| | movmf | dlycnt2 | ;load counter 2. |
| dloopE | | | ;don't do anything. |
| | nop | dlycnt2 | ;decrement secondary counter. |
| | decfsz | dloopE | ;continue secondary loop. |
| | goto | dlycnt3 | ;decrement primary counter. |
| | decfsz | dloopC | ;reload counter one. |

TABLE 5-continued

```
goto     dlycnt1    ;decrement counter1.
decfsz   dloopD     ;reload counter 3.
goto     start1
```

The embodiments of the present invention that have been described herein have the advantage that design and manufacture of the brushless DC fan is greatly simplified. In order to comply with the variety of customer specifications when using a discrete IC to drive the driver stage switches 50 and 70, the configuration of the components on the printed circuit board (PCB) must be changed or the layout of the PCB must be changed. In either case extensive manual labor, documentation control, and interfacing with vendors is involved.

The use of the microcontroller 20 to drive the driver stage switches 50 and 70 greatly simplifies the process of designing and manufacturing a brushless DC fan to customers' specifications. In accordance with the embodiments of the present invention, the software program instructions executed by the microcontroller 20 provide all the features that customers could require, including commutation, inrush current limit control, PWM speed control, analog speed control, a locked rotor restart, a locked rotor alarm, and a low speed alarm. Additional features can be added to the brushless DC fan simply by adding additional subroutines to the software program instructions. Furthermore, the parameters of the features of the brushless DC fan can easily be changed to comply with customers' specifications by editing the software program instructions that are downloaded into and executed by the microcontroller 20.

As a result, the embodiments according to the present invention advantageously enable the use of a single PCB configuration for each brushless DC fan, regardless of its particular features. The reliability of the Brushless DC fan increases dramatically because of the reduced number of components as compared to the use of discrete ICs with external circuitry. Additionally, hardware configuration changes, their corresponding documentation changes, and vendor interfacing become obsolete. Instead, once a particular customer's fan specifications have been received, a technician can edit the source code of the software program instructions for the microcontroller 20 and the software program instructions can be downloaded into the microcontroller 20 using a programming device located near the production line immediately prior to shipping the brushless DC fan to the customer. In accordance with the embodiments of the present invention, brushless DC fans can be simply and easily configured to comply with a customer's requirements and, consequently, product turnaround time increases dramatically.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims. For example, although the embodiments of the present invention have been described in the context of Brushless DC fans, those having skill in the art will understand the applicability of the present invention to any apparatus that utilizes a brushless DC motor.

What is claimed is:

1. A drive circuit for a brushless DC motor that controls at least one operation feature of said motor, said at least one feature utilizing at least one parameter that defines the desired operation of said feature, said drive circuit comprising:

a driver stage being configured to provide a current to a stator coil;

means coupled to said driver stage for varying said at least one parameter and for comparing said at least one parameter with a signal generated by the operation of said motor;

a software means controlling said means coupled to said driver stage;

a microcontroller comprising said software means; and a sensor coupled to said microcontroller;

wherein the means coupled to said driver stage further comprises a delay means for providing a delay, said delay corresponding to at least one parameter which can be varied by instructions from said software means; and wherein said sensor controls said delay means.

2. The drive circuit according to claim 1, wherein said means for varying includes input means for inputting said at least one parameter.

3. The drive circuit according to claim 1, wherein said means for varying said parameters comprises a microcontroller that executes software program instructions to control said features.

4. The drive circuit according to claim 1, wherein:

said feature comprises limiting inrush current drawn by said brushless DC motor upon start-up of said motor.

5. The drive circuit according to claim 4, wherein said parameter comprises a threshold reference value for said inrush current.

6. The drive circuit according to claim 4, wherein said parameter comprises a compare value from which a voltage representing said inrush current is subtracted.

7. The drive circuit according to claim 1, wherein said feature comprises speed control of said brushless DC motor using an analog voltage.

8. The drive circuit according to claim 7, wherein said parameter comprises a threshold reference value for the speed of said motor.

9. The drive circuit according to claim 1, wherein said feature comprises generating an alarm signal.

10. The drive circuit according to claim 9, wherein said parameter comprises a threshold level for the speed of said DC motor.

11. The drive circuit according to claim 9, wherein said parameter further comprises a value stored in a counter.

12. The drive circuit according to claim 9, wherein said parameter further comprises a value indicating a time for generating said alarm.

13. The drive circuit according to claim 1, wherein said feature comprises determining a locked rotor condition.

14. The drive circuit according to claim 13, wherein said parameter comprises a value stored in a counter.

15. The drive circuit according to claim 1, wherein said feature comprises generating an alarm in response to the detection of a locked rotor condition.

16. The drive circuit according to claim 15, wherein said parameter comprises a value stored in a counter.

17. The drive circuit according to claim 1, wherein said feature comprises restarting said motor following the detection of a locked rotor condition.

18. The drive circuit according to claim 17, wherein said parameter comprises a value stored in a counter.

19. A drive circuit for a brushless DC motor that controls at least one of a number of possible operation features of said motor, said drive circuit comprising:

a driver stage being configured to provide a current for a stator coil;

means for varying which of said number of possible operation features of said motor are controlled and for controlling said varied feature in response to a signal generated by the operation of said motor;

a software means controlling said means for varying;

a microcontroller comprising said software means; and a sensor coupled to said microcontroller;

wherein the means for varying further comprises a delay means for providing a delay, said delay corresponding to at least one parameter which can be varied by instructions from said software means; and wherein said sensor controls said delay means.

20. The drive circuit according to claim 19, wherein said at least one of a number of possible operation features of said motor comprises speed control of said motor using a pulse-width modulated signal.

21. The drive circuit according to claim 19, wherein said at least one of a number of possible operation features of said motor comprises speed control of said motor using an analog voltage.

22. The drive circuit according to claim 19, wherein said at least one of a number of possible operation features of said motor comprises limiting inrush current drawn by said motor upon start-up of said motor.

23. The drive circuit according to claim 19, wherein said at least one of a number of possible operation features of said motor comprises generating an alarm signal if the speed of said motor is below a threshold level.

24. The drive circuit according to claim 19, wherein said at least one of a number of possible operation features of said motor comprises generating an alarm in response to the detection of a locked rotor condition.

25. The drive circuit according to claim 19, wherein said at least one of a number of possible operation features of said motor comprises restarting said motor following the detection of a locked rotor condition.

26. A fan, comprising:

a brushless DC motor;

a drive circuit for said brushless DC motor, said drive circuit controlling at least one operation feature of said motor, said at least one feature utilizing at least one parameter that defines the desired operation of said feature;

said driving circuit comprising:

a driver being configured to provide a current to a stator coil;

means coupled to said driver stage for varying said at least one parameter and for comparing said at least one parameter with a signal generated by the operation of said motor;

a software means controlling said means coupled to said driver stage;

a microcontroller comprising said software means; and a sensor coupled to said microcontroller;

wherein the means coupled to said driver stage further comprises a delay means for providing a delay, said delay corresponding to at least one parameter which can be varied by instructions from said software means; and wherein said sensor controls said delay means.

27. The fan according to claim 26, wherein said means for varying said parameters comprises a microcontroller that executes software program instructions to control said features.

28. The fan according to claim 26, wherein said feature comprises limiting inrush current drawn by said brushless DC motor upon start-up of said motor.

29. The fan according to claim 28, wherein said parameter comprises a threshold reference value for said inrush current.

30. The fan according to claim 28, wherein said parameter comprises a compare value from which a voltage representing said inrush current is subtracted.

31. The fan according to claim 26, wherein said feature comprises speed control of said brushless DC motor using an analog voltage.

32. The fan according to claim 31, wherein said parameter comprises a threshold reference value for the speed of said motor.

33. The fan according to claim 26, wherein said feature comprises generating an alarm signal.

34. The fan according to claim 33, wherein said parameter comprises a threshold level for the speed of said DC motor.

35. The fan according to claim 33, wherein said parameter further comprises a value indicating a time for generating said alarm.

36. The fan according to claim 26, wherein said feature comprises determining a locked rotor condition.

37. The fan according to claim 26, wherein said feature comprises restarting said motor following the detection of a locked rotor condition.

38. A fan comprising:

a brushless DC motor;

a drive circuit for said brushless DC motor that controls at least one of a number of possible operation features of said motor;

said drive circuit comprising:

a driver stage for providing a current for a stator coil;

means for varying which of said number of possible operation features of said motor are controlled and for controlling said varied feature in response to a signal generated by the operation of said motor;

a software means controlling said means for varying;

a microcontroller comprising said software means; and a sensor coupled to said microcontroller;

wherein the means for varying further comprises a delay means for providing a delay, said delay corresponding to at least one parameter which can be varied by instructions from said software means; and wherein said sensor controls said delay means.

39. The fan according to claim 38, wherein said at least one of a number of possible operation features of said motor comprises speed control of said motor using a pulse-width modulated signal.

40. The fan according to claim 38, wherein said at least one of a number of possible operation features of said motor comprises speed control of said motor using an analog voltage.

41. The fan according to claim 38, wherein said at least one of a number of possible operation features of said motor comprises limiting inrush current drawn by said motor upon start-up of said motor.

42. The fan according to claim 38, wherein said at least one of a number of possible operation features of said motor comprises generating an alarm signal if the speed of said motor is below a threshold level.

43. The fan according to claim 38, wherein said at least one of a number of possible operation features of said motor comprises generating an alarm in response to the detection of a locked rotor condition.

44. The fan according to claim 38, wherein said at least one of a number of possible operation features of said motor comprises restarting said motor following the detection of a locked rotor condition.

* * * * *